United States Patent
Hamano

(10) Patent No.: US 7,352,963 B2
(45) Date of Patent: Apr. 1, 2008

(54) CAMERA

(75) Inventor: Hideyuki Hamano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 11/151,608

(22) Filed: Jun. 13, 2005

(65) Prior Publication Data

US 2005/0276594 A1    Dec. 15, 2005

(30) Foreign Application Priority Data

Jun. 15, 2004    (JP)    ............................. 2004-177541

(51) Int. Cl.
*G03B 15/03* (2006.01)
*H04N 5/222* (2006.01)

(52) U.S. Cl. ...................... 396/177; 348/371

(58) Field of Classification Search ................ 396/177, 396/176, 178; 348/208.2, 208.3, 208.4, 208.5, 348/370, 371
See application file for complete search history.

(56) References Cited

U.S. PATENT DOCUMENTS 5,565,941 A * 10/1996 Kaneko .................... 396/177
5,749,003 A * 5/1998 Tanabe ....................... 396/177
6,285,833 B1   9/2001 Yamane ...................... 396/177
6,351,609 B1   2/2002 Hosokawa et al. .......... 396/177

FOREIGN PATENT DOCUMENTS

JP    07-056225    3/1995
JP    07-056226    3/1995

* cited by examiner

*Primary Examiner*—Rodney Fuller
(74) *Attorney, Agent, or Firm*—Cowan, Liebowitz & Latman, P.C.

(57) ABSTRACT

A camera is disclosed, in which the generation of a large gap between the illumination unit and the camera body is suppressed. The camera comprises: an illumination unit movable between a protrusion position and a retraction position, and biased toward the protrusion position; and an engaging member movable between an engagement, retreat and standby positions. The engaging member includes a transmission portion where a driving force is transmitted by contacting with the illumination unit being moved from the protrusion position to the retraction position. The engaging member is rotated from the standby position to the retreat position by receiving the driving force from the illumination unit via the transmission portion, and is rotated to the engagement position by a second biasing member to engage with the illumination unit after the contact of the transmission portion with the illumination unit is released at the retreat position.

4 Claims, 6 Drawing Sheets

CAMERA

FIELD OF THE INVENTION

The present invention relates to a camera including an illumination unit that is movable to a protrusion position at which the illumination unit is protruded from the camera body and a retraction position at which the illumination unit is retracted with respect to the camera body.

BACKGROUND OF THE INVENTION

Conventionally, a flash unit (illumination unit) is proposed, which is retracted with respect to the camera body when not used, and is protruded from the camera body only when used. In a camera having such a flash unit, the flash unit is biased toward the protrusion position by a biasing member such as a spring. Further, a lock mechanism is provided, which holds the flash unit at the retraction position against the biasing force of the biasing member when not used, and releases the holding to move the flash unit to the protrusion position (see Japanese Patent Laid-open application No. H07-56225).

The lock mechanism holds the flash unit at the retraction position by the engagement of the flash unit and a hook member biased by a biasing member. The engagement of the flash unit and the hook member is released by rotating the hook member against the biasing force of the biasing member when the flash unit is moved from the retraction position to the protrusion position.

Here, there is a possibility that a gap is generated between the flash unit and the camera body depending on the relationship between the force of the biasing member for biasing the flash unit toward the protrusion position and the force of the biasing member for biasing the hook member holding the flash unit at the retraction position.

In addition, in the mechanism including the above-mentioned hook member, a certain degree of gap for inserting an engaging portion of the flash unit, which engages with the hook member, is required between the hook member and the camera body that are in a nonengagement state.

However, generating the gap between the flash unit and the camera body makes it easier for dusts to enter the camera body through the gap and deteriorates the external appearance quality of the camera.

For solving the problem, a camera having a gap adjustment mechanism for adjusting the gap between the flash unit and the camera body is proposed in Japanese Patent Laid-open application No. H07-56226.

However, providing the gap adjustment mechanism, proposed in Japanese Patent Laid-open application No. H07-56226, to the camera increases the number of parts, and thereby resulting in increases of the assembly processes, costs and the size of the camera.

On the other hand, there is a structure for reducing the gap size, in which the flash unit is held by a strong force at the retraction position by making the force for biasing the hook member stronger.

However, in this structure, a strong force is required for releasing the engagement of the hook member and the flash unit. Therefore, in a case where an actuator is used for driving the hook member, for example, the driving power of the actuator must be larger.

Further, in this case, there is a possibility that the frictional force between the engaging portion of the flash unit and the hook member increases, and the abrasion of them by the frictional force is generated. Thereby, it becomes difficult to move the flash unit smoothly between the retraction position and the protrusion position.

BRIEF SUMMARY OF THE INVENTION

An object of the present invention is to provide a camera, in which the generation of a large gap between the illumination unit and the camera body is suppressed, the illumination unit can be moved smoothly between a retraction position and a protrusion position, and furthermore the engagement and holding of the illumination unit can be released by a relatively small force.

A camera as an aspect of the present invention comprises: an illumination unit, which is movable between a protrusion position at which the illumination unit is protruded from a camera body and a retraction position at which the illumination unit is retracted with respect to the camera body, the illumination unit being biased toward the first position by a first biasing member; an engaging member, which includes an engaging portion that is engageable with the illumination unit, the engaging member being rotatable between an engagement position at which the engaging portion engages with the illumination unit located at the retraction position, a retreat position at which the engaging portion is retreated from a position where the engaging portion engages with the illumination unit, and a standby position that is located on the opposite side of the retreat position with respect to the engagement position; and a second biasing member, which generates a biasing force for holding the illumination unit engaged with the engaging member at the retraction position. The engaging member includes a transmission portion at which a driving force is transmitted by contacting with the illumination unit being moved from the protrusion position to the retraction position. Further, the engaging member is rotated from the standby position to the retreat position by receiving the driving force from the illumination unit via the transmission portion, and the engaging member is rotated to the engagement position to engage with the illumination unit located on the retraction position by the biasing force of the second biasing member after the contact of the transmission portion with the illumination unit is released at the retreat position.

A camera system as another aspect of the present invention comprises the above-mentioned camera and a lens apparatus, which is mounted on the camera.

Other objects and further features of the present invention will become readily apparent from the following description of the preferred embodiments with reference to accompanying drawings.

DETAILED DESCRIPTION OF THE PREFERRED EMBODIMENTS

A description will now be given of the preferred embodiment of the present invention by referring to the accompanying drawings.

Embodiment 1

A description will be given of a camera system of Embodiment 1 of the present invention. The camera system comprises a camera body and a lens apparatus that is detachably mounted on the camera body. Although the description of a lens-interchangeable camera system will be given in this embodiment, the present invention can be applied to a camera with a lens.

Figure 6:
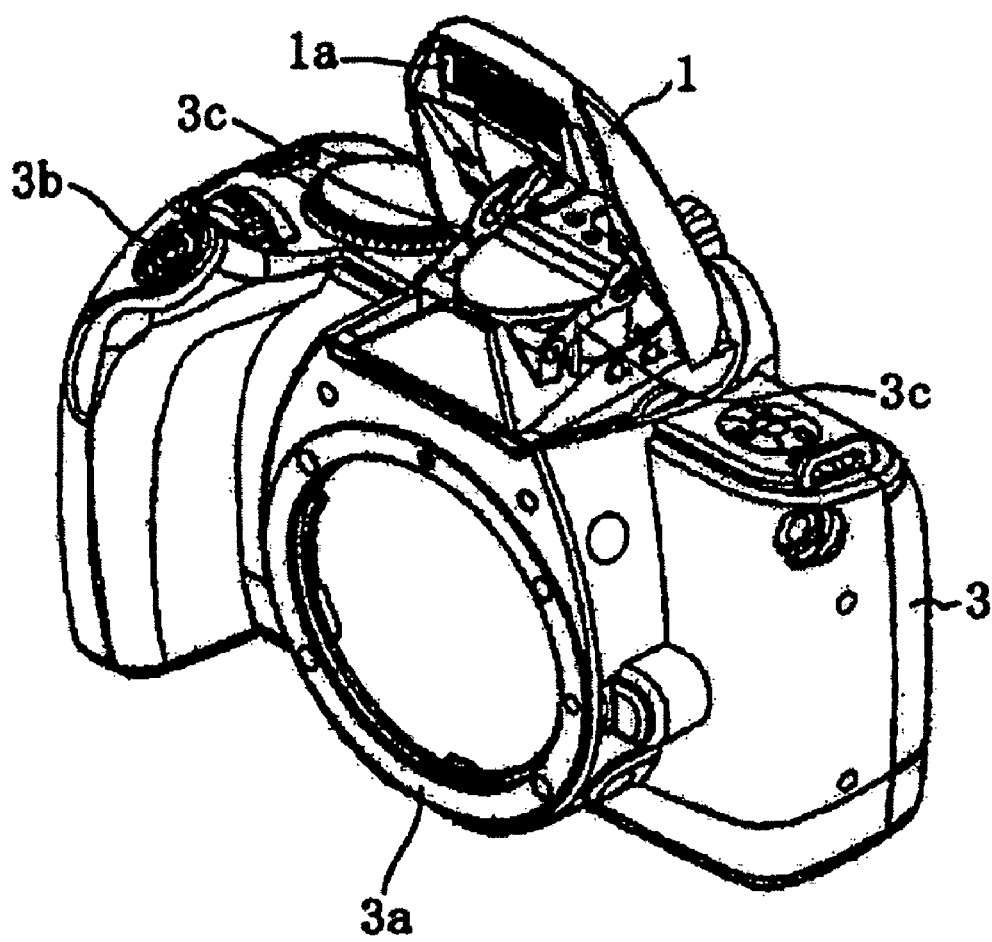
FIG. 6 is an external perspective view of the camera body of Embodiment 1.

FIG. 6 is an external perspective view of the camera body of the present embodiment. In FIG. 6, the illumination unit 1, which is a flash unit, is rotatably attached to the top portion of the camera body 3. The illumination unit 1 is rotatable between a protrusion position at which the illumination unit 1 protrudes from the camera body 3 and can irradiate illumination light, and a retraction position at which the illumination unit 1 is retracted on the top portion of the camera body 3. The illumination unit 1 has the illumination portion 1a irradiating the illumination light to an object.

The illumination unit 1 is biased toward the protrusion position by a first spring 4 described later, which is a first biasing member, and is held at the protrusion position by a lever member 3c that is rotatably attached to the camera body 3.

A mount portion 3a is provided on the front surface of the camera body 3; the lens apparatus, not shown in the figure, is mounted thereon. A half-push of a release button 3b provided on the camera body 3 makes image-taking preparation operations such as a photometry operation and a focus detection operation start, and a full-push of the release button 3b makes image-taking operations such as an exposure of an image-pickup element (a CCD sensor or a CMOS sensor) provided in the camera body 3 or a film start.

Next, the description will be given of a engagement mechanism that is provided in the camera body 3 and holds the illumination unit 1 at the retraction position.

Figure 1:
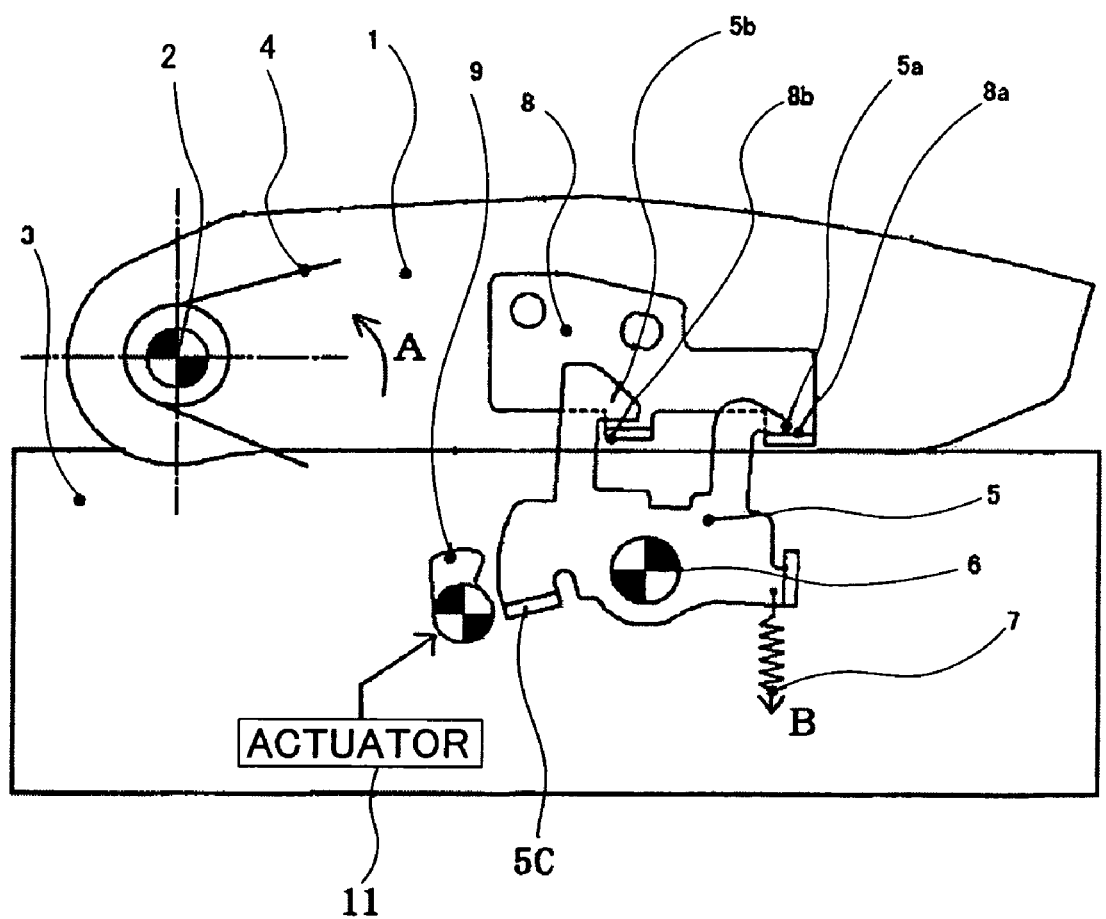
FIG. 1 is a schematic view showing the camera body of Embodiment 1 of the present invention when the illumination unit is located at the retraction position.

FIG. 1 is a schematic view showing the structure of part of the camera body of Embodiment 1. FIG. 1 shows a state in which the illumination unit 1 is located at the retraction position.

In FIG. 1, the illumination unit 1 is rotatably supported by a shaft 2 fixed to the camera body 3. Although Embodiment 1 has a structure in which the illumination unit 1 is rotated between the protrusion position and the retraction position, the present invention can be applied to other structures. In other words, the illumination unit may be protruded from and retracted with respect to the camera body by moving it in a plane substantially orthogonal to the image-taking optical axis (by moving it in the up and down direction, for example).

One end of the first spring 4 engages with the illumination unit 1, and the other end engages with the camera body 3.

The first spring 4 biases the illumination unit 1 in the direction to the protrusion position, which is the direction shown by the arrow A.

Reference numeral 5 denotes an engaging lever (engaging member), which is rotatably supported by an engaging lever shaft 6 fixed to the camera body 3. A second spring 7, which is a second biasing member, is attached to the engaging lever 5; the second spring 7 biases the engaging lever 7 in the direction shown by the arrow B, which is the clockwise direction around the engaging lever shaft 6 in FIG. 1.

Reference numeral 8 denotes an engaging plate, which is fixed to a predetermined position of the illumination unit 1. The engaging plate 8 has an engaging portion 8a, which is engageable with an engaging claw (engaging portion) 5a formed on the engaging lever 5, and a contact portion 8b, which can contact with a transmission portion 5b formed on the engaging lever 5.

Although the engaging portion 8a and the contact portion 8b are provided on the engaging plate 8, which is one member, the engaging portion 8a and the contact portion 8b may be provided on separate members. Further, the engaging portion 8a and the contact portion 8b may be formed on the exterior member of the illumination unit 1 integrally.

Here, the illumination unit 1 is held at the retraction position by the engagement of the engaging portion 8a of the engaging plate 8 with the engaging claw Sa of the engaging lever 5.

Reference numeral 9 denotes an engaging lever retreating member, which is rotatably attached to the camera body 3. The engaging lever retreating member 9 is connected to an actuator 11 via a power transmission mechanism, not shown in the figure, and is rotated in one direction (the clockwise direction in FIG. 1) by receiving the driving force from the actuator 11.

The engaging lever retreating member 9 contacts the contact portion 5c formed on the engaging lever 5 by rotating in the above-mentioned one direction, and thereby rotating the engaging lever 5 in the counterclockwise direction in FIG. 1 against the biasing force of the second spring 7.

Although the engaging lever retreating member 9 is rotated by the driving force of the actuator 11 in the present embodiment, the engaging lever retreating member 9 may be rotated by other means. For example, the engaging lever retreating member 9 may be rotated by a user's operation of an operation member, which is provided on the camera body 3 for rotating the engaging lever retreating member 9 in one direction.

Next, the description will be given of the operation of the above-mentioned structure when the illumination unit 1 is moved between the protrusion position and the retraction position. First, the description will be given of the operation when the illumination unit 1 is moved from the retraction position to the protrusion position.

In the state in which the illumination unit 1 is located at the retraction position (the state shown in FIG. 1), the engaging lever 5 is located at an engagement position where the engaging claw 5a engages with the engaging portion 8a of the engaging plate 8. Since the biasing force of the second spring 7 is set so as to be larger than the biasing force of the first spring 4, the engaging claw 5a biased by the second spring 7 pushes the engaging portion 8a of the engaging plate 8 to the camera body side against the biasing force of the first spring 4. Thereby, the illumination unit 1 is held at the retraction position.

As shown in FIG. 1, the engaging claw 5a of the engaging lever 5 and the engaging portion 8a of the engaging plate 8 engages with each other at the position on the front side (the right side in FIG. 1) further than the engaging lever shaft 6, that is, the position on the side opposite to the shaft 2 of the illumination unit 1 with respect to the position of the engaging lever shaft 6.

According to this structure, it becomes possible to strengthen the force of the engaging claw 5a of the engaging lever 5 for pushing the engaging portion 8a of the engaging plate 8 to the camera body side in comparison with a conventional case where the engaging claw 5a and the engaging portion 8a engages with each other at the same position as the engaging lever shaft 6 (at substantially the same position in the up and down direction of the camera body 3). In other words, it becomes possible to increase the force component (the component in the up and down direction of the camera body 3) for pushing the engaging portion 8a of the engaging plate 8 to the camera body side (downward in FIG. 1), of the rotational force of the engaging lever 5 biased by the second spring 7.

Thereby, it is possible to hold the illumination unit 1 at the retraction position even if the force of the second spring 7 (the biasing force of the engaging lever 5) is set smaller than the conventional structure. Furthermore, it is possible to reduce the driving force of the actuator 11 for rotating the engaging lever retreating member 9 according to the reduction of the force of the second spring 7.

Figure 2:
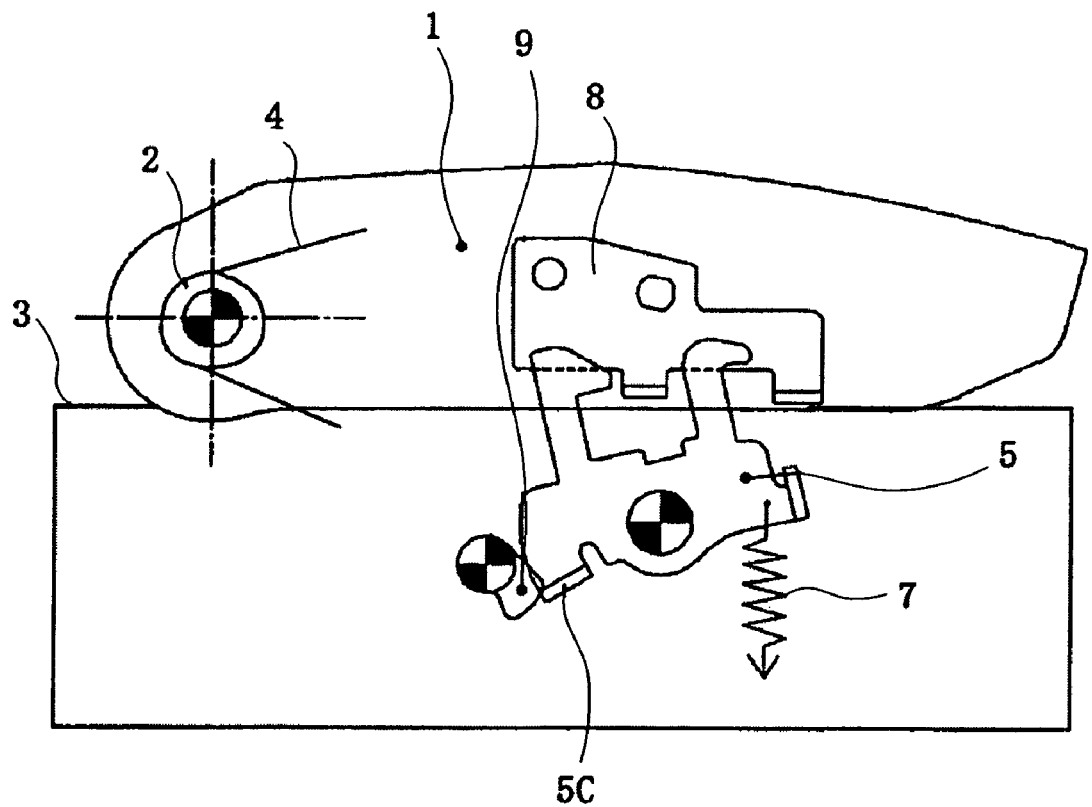
FIG. 2 is a schematic view showing the camera body of Embodiment 1 when the engagement of the engaging lever and the engaging plate has been released.

When the actuator 11 is driven to rotate the engaging lever retreating member 9 in one direction in the state shown in FIG. 1, the engaging lever retreating member 9 contacts the contact portion 5c of the engaging lever 5 and rotates the engaging lever 5 to a retreat position that locates on the counterclockwise side further than the engagement position in FIG. 1, that is, a position at which the engaging claw 5a of the engaging lever 5 does not engage with the engaging portion 8a of the engaging plate 8 as shown in FIG. 2.

Thereby, the engagement of the engaging claw 5a of the engaging lever 5 and the engaging portion 8a of the engaging plate 8 is released, and the illumination unit 1 is rotated in the direction from the retraction position to the protrusion position by receiving the biasing force of the first spring 4.

Figure 3:
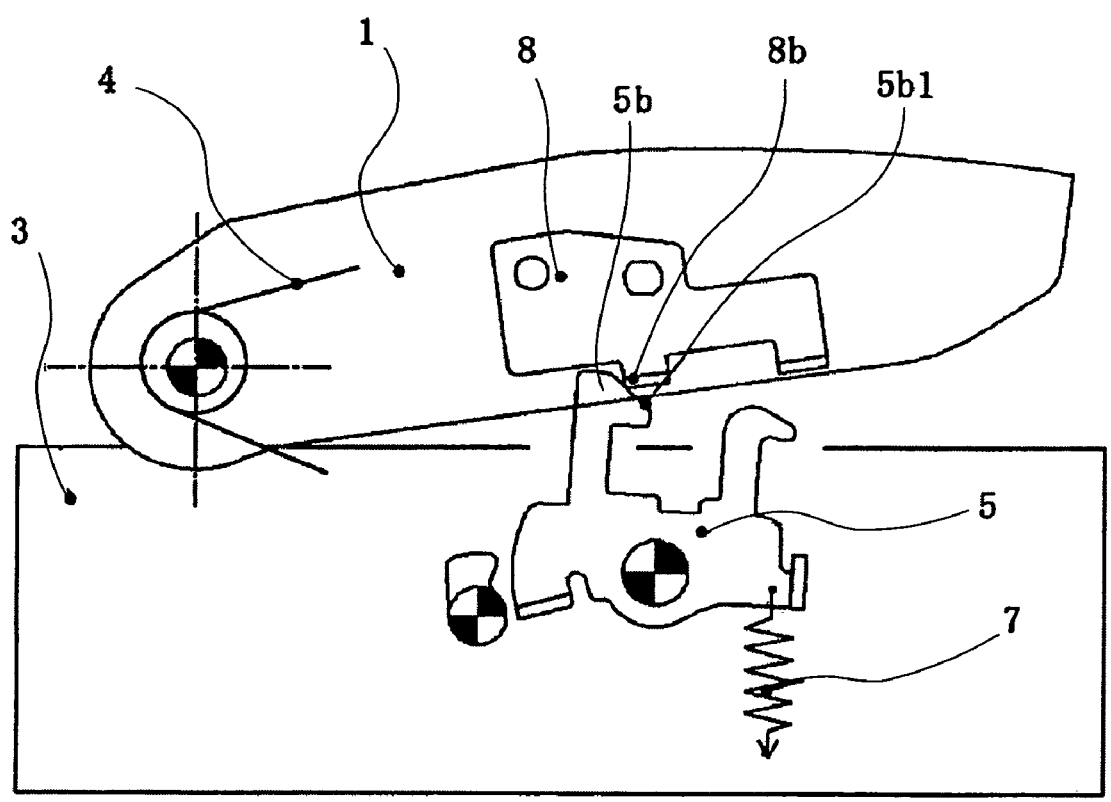
FIG. 3 is a schematic view showing the camera body of Embodiment 1 before the engaging lever and the engaging plate engage.

When the illumination unit 1 moves from the retraction position to the protrusion position, the engaging lever 5 is rotated in the clockwise direction in FIG. 2 by the biasing force of the second spring 7, and then stopped in the state shown in FIG. 3 by contacting a stopper, not shown in the figure.

Next, the description will be given of the operation when the illumination unit 1 is moved from the protrusion position to the retraction position.

When the illumination unit 1 located at the protrusion position shown in FIG. 6 is rotated toward the retraction position against the biasing force of the first spring 4 (by hand power, for example), the contact portion 8b of the engaging plate 8 contacts an inclined plane (taper portion) 5b1 on the transmission portion 5b of the engaging lever as shown in FIG. 3.

When the illumination unit 1 is further rotated from the state shown in FIG. 3 toward the retraction position, the contact portion 8b of the engaging plate 8 pushes the inclined plane 5b1 on the transmission portion 5b of the engaging lever 5. Thereby, the engaging lever 5 is rotated in the counterclockwise direction in FIG. 3 against the biasing force of the second spring 7. Here, the inclined plane 5b1 on the transmission portion 5b of the engaging lever 5 functions as a cam that rotates the engaging lever 5 toward the retreat position by being pushed by the contact portion 8b of the engaging plate 8.

Figure 4:
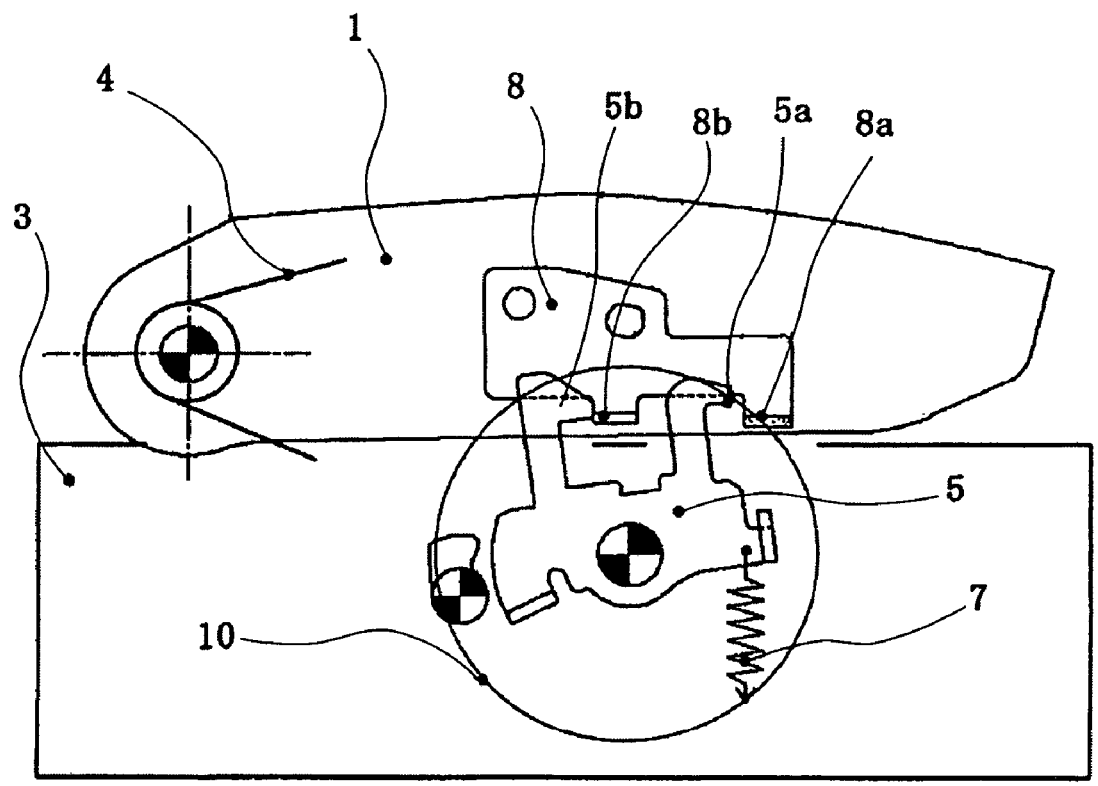
FIG. 4 is a schematic view showing the camera body of Embodiment 1 immediately before the engaging lever and the engaging plate engage.
Figure 5:
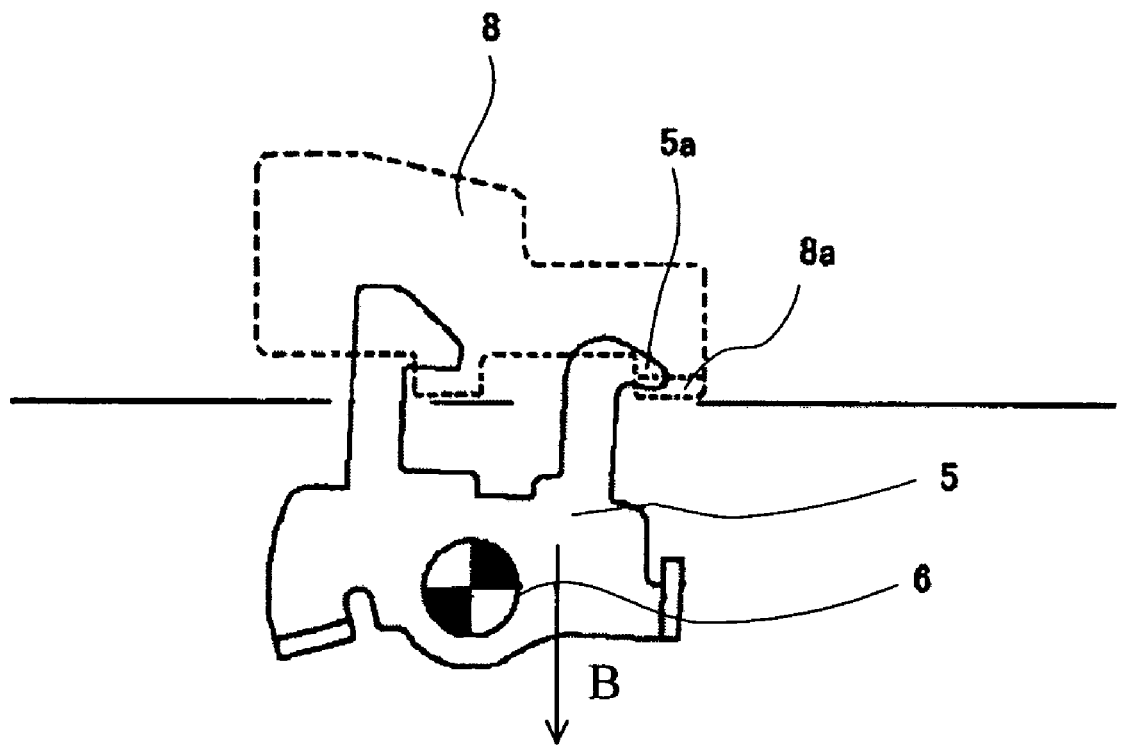
FIG. 5 is a figure showing the relationship between the position of the engaging plate when the illumination unit is located at the retraction position and the position of the engaging lever in a nonengagement state in Embodiment 1.

FIG. 4 shows a state in which the engaging lever 5 is rotated by being pushed at the transmission portion 5b by the contact portion 8b.

When the illumination unit 1 is further rotated toward the retraction position from the state shown in FIG. 4, the contact of the transmission portion 5b of the engaging lever 5 and the contact portion 8b of the engaging plate 8 is released, and then the engaging lever 5 biased by the second spring 7 starts to rotate in the clockwise direction. At this time, the engaging portion 8a of the engaging plate 8 is located on the rotation track 10 of the engaging claw 5a of the engaging lever 5. Therefore, by the engagement of the engaging claw 5a of the engaging lever 5 receiving the biasing force of the second spring 7 with the engaging portion 8a of the engaging plate 8, the illumination unit 1 is rotated to the retraction position.

In other words, when the illumination unit 1 is rotated from the protrusion position toward the retraction position, by rotating the illumination unit 1 to a position at which the contact of the transmission portion 5b of the engaging lever 5 and the contact portion 8b of the engaging plate 8 is released after the contact portion 8b contacts the transmission portion 5b, the illumination unit 1 is then automatically moved to the retraction position by the engaging lever 5 receiving the biasing force of the second spring 7. Thereby, the illumination unit 1 is held at the retraction position.

As shown in FIG. 3, when the illumination unit 1 is located at the protrusion position, that is, in the nonengagement state in which the engagement of the engaging lever 5 and the engaging plate 8 is released, the engaging claw 5a is located at a position corresponding to the position of the engaging lever 5 rotated slightly by the biasing force of the second spring 7 from the position, shown in FIG. 1, where the engaging claw 5a engages with the engaging portion 8a of the engaging plate 8.

In other words, the engaging lever 5 in the nonengagement state is located at a standby position rotated by a predetermined amount in the direction shown by the arrow B from the position in the state in which the engaging lever 5 engages with the illumination unit 1.

According to this structure, in the state in which the engaging claw 5a of the engaging lever 5 engages with the engaging portion 8a of the engaging plate 8, it is possible to push the engaging portion 8a to the camera body side to make the illumination unit 1 contact closely the top surface of the camera body 3.

Here, in a conventional structure in which only the engaging claw 5a of the engaging lever 5 and the engaging portion 8a of the engaging plate 8 are provided, that is, a structure in which the transmission portion 5b and the contact portion 8b are not provided on the engaging lever 5 and the engaging plate 8, respectively, it is not possible to make the engaging claw 5a engage with the engaging portion 8a when the illumination unit 1 is rotated to the retraction position.

In contrast, in the present embodiment, when the illumination unit 1 is rotated from the protrusion position to the retraction position, the engaging claw 5a of the engaging lever 5 is retreated from the position where it engages with the engaging portion 8a of the engaging plate 8 by being pushed at the transmission portion 5b by the contact portion 8b of the engaging plate 8 and rotated. Therefore, by rotating the engaging claw 5a to the side of the engaging potion 8a after the progress of the engaging portion 8a to the camera body side further than the engaging claw 5a in this retreated state, it is possible to make the engaging claw 5a engage with the engaging portion 8a.

In the present embodiment, since the illumination unit 1 can contact the top surface of the camera body 3 without increasing the biasing force of the second spring 7, the increase of the frictional force at the time of the engagement with the illumination unit 1 is prevented. Therefore, the abrasion of the engaging lever 5 and the engaging plate 8 can be suppressed.

As described above, according to the present embodiment, since the illumination unit 1 is located closer to the camera body 3 at the retraction position, the generation of a large gap can be suppressed between the illumination unit 1 and the camera body 3. Further, since the engaging lever 5 is rotated from the standby position to the retreat position by the illumination unit 1 rotating from the protrusion position to the retraction position, it is possible to make the engaging lever 5 engage with the illumination unit 1 rotating toward the retraction position easily.

This application claims a foreign priority based on Japanese Patent Application No. 2004-177541, filed on Jun. 15, 2004, which is hereby incorporated by reference herein.

What is claimed is:

1. A camera comprising:
   an illumination unit rotatable between a protrusion position at which the illumination unit is protruded from a camera body and a retraction position at which the illumination unit is retracted with respect to the camera body, the illumination unit including a contact portion and an engaging portion;
   a rotatable engaging lever including an engaging claw that engages with the engaging portion of the illumination unit when the illumination unit is located at the retraction position, and a transmission portion with which the contact portion of the illumination unit makes contact in the middle of the rotation of the illumination unit from the protrusion position to the retraction position, the engaging claw not engaging with the engaging portion of the illumination unit when the transmission portion contacts the contact portion of the illumination unit, and the transmission portion not contacting the contact portion of the illumination unit when the engaging claw engages with the engaging portion of the illumination unit; and
   a biasing member biasing the engaging lever in a direction in which the engaging claw engages with the engaging portion when the illumination unit is located at the retraction position,
   wherein when the illumination unit rotates from the protrusion position to the retraction position, the contact portion of the illumination unit contacts the transmission portion to rotate the engaging lever against a biasing force of the biasing member.

2. The camera according to claim 1, wherein, when the contact of the transmission portion and the contact portion of the illumination unit is released in the middle of the rotation of the illumination unit from the protrusion position to the retraction position, the engaging portion of the illumination unit is located on a rotation track of the engaging claw of the engaging lever.

3. The camera according to claim 1, wherein the engaging claw and the transmission portion are arranged such that a distance from a rotation axis of the illumination unit to the engaging claw is longer than that from the rotation axis of the illumination unit to the transmission portion.

4. The camera according to claim 1, wherein a rotation center of the engaging lever is disposed between the engaging claw and the transmission portion.

* * * * *

UNITED STATES PATENT AND TRADEMARK OFFICE
CERTIFICATE OF CORRECTION

PATENT NO.       : 7,352,963 B2  
APPLICATION NO.  : 11/151608  
DATED            : April 1, 2008  
INVENTOR(S)      : Hideyuki Hamano It is certified that error appears in the above-identified patent and that said Letters Patent is hereby corrected as shown below:

Column 4, line 26, delete "claw Sa" and insert -- claw 5a --

Signed and Sealed this

Ninth Day of September, 2008

JON W. DUDAS  
*Director of the United States Patent and Trademark Office*